United States Patent [19]

Nakamura

[11] 4,311,525

[45] Jan. 19, 1982

[54] SLIDING MEMBER FOR USE IN INTERNAL COMBUSTION ENGINE

[75] Inventor: Yoshikatsu Nakamura, Omiya, Japan

[73] Assignee: Nippon Piston Ring Co., Ltd., Tokyo, Japan

[21] Appl. No.: 72,749

[22] Filed: Sep. 5, 1979

[30] Foreign Application Priority Data

Sep. 22, 1978 [JP] Japan ................................ 53-115888

[51] Int. Cl.³ .............................................. B22F 5/00
[52] U.S. Cl. .................................... 75/240; 428/550; 428/564; 428/565
[58] Field of Search .................. 75/240; 428/550, 564, 428/565

[56] References Cited

U.S. PATENT DOCUMENTS

| 3,556,747 | 1/1971 | Hyde et al. ...................... 75/240 X |
| 3,837,817 | 9/1974 | Nakamura ........................... 428/564 |
| 3,938,814 | 2/1976 | Cromwell ........................... 428/550 |

Primary Examiner—Brooks H. Hunt
Attorney, Agent, or Firm—Sughrue, Mion, Zinn, Macpeak & Seas

[57] ABSTRACT

A sliding member, particularly adapted for use in an internal combustion engine, having a sprayed-on sliding surface consisting of 95.5 to 99.5% metal carbide such as chromium carbide and the remainder molybdenum. The hardness of the metal carbide is in a range of $H_v 750$ to $H_v 2,000$, the porosity of the layer is 30% or less and the thickness of the layer is 2.5 mm or less.

4 Claims, 1 Drawing Figure

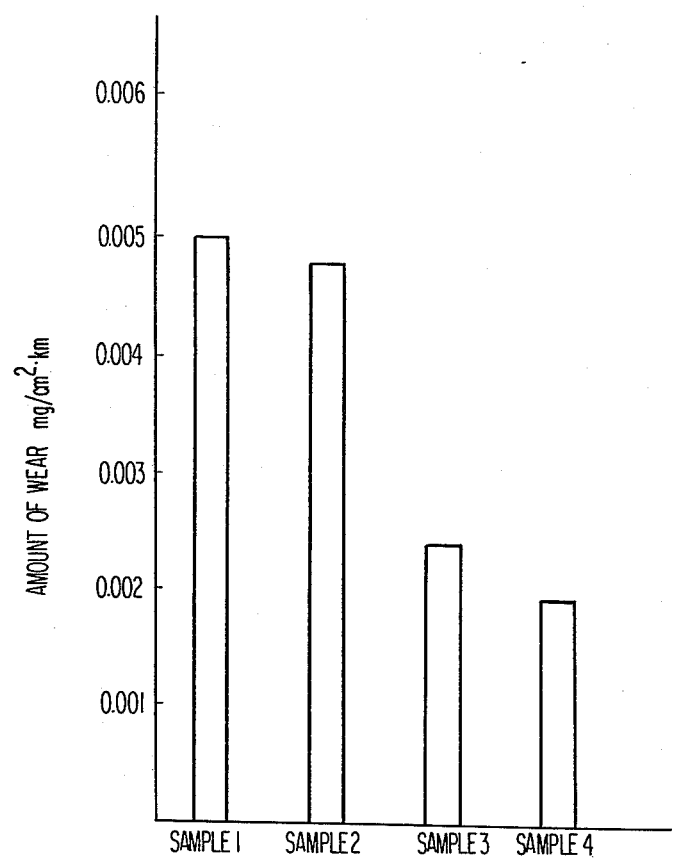

SLIDING MEMBER FOR USE IN INTERNAL COMBUSTION ENGINE

BACKGROUND OF THE INVENTION

This invention relates to a sliding member for use in an internal combustion engine and more particularly to a sliding member in which the sliding surface is produced by alloy spraying.

Sliding members for use in an internal combustion engine are subject to severe working conditions as typified by the relative sliding movement between a piston ring and a cylinder. Various proposals have been made in order to produce sliding members capable of use under severe working conditions. For example, molybdenum or molybdenum alloy spraying has been proposed as disclosed in U.S. Pat. Nos. 2,905,512 and 3,412,198. However, molybdenum spraying has serious drawbacks in that bonding between molybdenum particles is weak so that molybdenum particles have a tendency to drop off or to become separated from the resultant sprayed layer resulting in abrasive wear during operation. Further, since molybdenum is an expensive material such techniques are quite costly.

In order to overcome these difficulties, spraying of a mixture of metal and carbide has been proposed as disclosed in U.S. Pat. Nos. 3,539,192, 3,606,359, 3,615,099, 3,617,349, 3,620,137, 3,749,559 and 3,809,546. According to the disclosures of these patents, a mixture of tungsten carbide having an extremely high hardness and nickel is sprayed. The sprayed layer thus provided has an extremely high hardness so that this technique has several drawbacks in terms of machinability and production cost. Further, high energy is required to spray tungsten carbide, so that low productivity results.

SUMMARY OF THE INVENTION

It is therefore an object of the present invention to overcome the above-mentioned drawbacks by providing an improved sliding member having a sprayed layer of a mixture of carbide and metal and which thereby has an excellent wear resistance.

Another object of this invention is to provide such a sliding member for use in an internal combustion engine wherein peeling of the sprayed layer or particles thereof is prevented and wherein the sprayed layer has a good machinability and can be produced economically. The sprayed layer which functions as a sliding surface consists of 95.5 to 99.5% by weight of metal carbide preferably, chromium carbide having a hardness of $H_v$ 750 to $H_v$ 2,000 (Vickers hardness) and 0.5 to 4.5% by weight of molybdenum. The porosity of the sprayed layer is 30% or less and the thickness thereof is 2.5 mm or less.

This invention will be described in detail with reference to the drawing and the description of the preferred embodiment.

BRIEF DESCRIPTION OF THE DRAWING

In the drawing;

The single FIGURE is a graphical representation showing the amount of wear of test pieces.

DESCRIPTION OF THE PREFERRED EMBODIMENTS

A sprayed layer according to this invention consists of 95.5 to 99.5% by weight of metal carbide having a hardness of Hv 750 to Hv 2,000 and 0.5 to 4.5% by weight of molybdenum. The reasons for these ranges are as follows.

The metal carbide is useful as a wear-resistant material since it provides a high hardness. However, utilization of 100% metal carbide would tend to give rise to abrasive wear in the sprayed layer during operation since bonding between metal carbide particles is rather weak. The bonding strength between metal carbide particles is increased by adding molybdenum particles which prevents the particles from dropping off or separating from the layer. The optimum amount of molybdenum is 0.5 to 4.5% by weight. That is, if the molybdenum amount is less than 0.5% by weight, sufficient bonding strength between the particles is not obtained leading to dropping off or separation of the particles. On the other hand, if the amount is more than 4.5% by weight, the wear resistance of the sprayed layer is reduced because the metal carbide portion is correspondingly reduced.

Further, the hardness of the metal carbide is in the range of Hv 750 to Hv 2,000. If the hardness were to be less than Hv 750, an excellent wear resistance useful for forming sliding members for use in an internal combustion engine would not be obtainable. On the other hand, if the hardness were to be more than Hv 2,000 the amount of wear of opposing members would also increase, so that a relatively desirable wear resistance would again not be obtainable.

Furthermore, the porosity of the sprayed layer should be 30% or less. A porous structure in the sprayed layer is effective to retain lubrication oil therein. If, however, the porosity of the layer is more than 30%, the strength of the sprayed layer is lowered so that the particles of the sprayed layer may again drop off or be released or the sprayed layer may peel off from its base member.

The thickness of the sprayed layer should be 2.5 mm or less to prevent the layer from easily peeling off from its base member. Among metal carbides, chromium carbide is the most preferable in terms of hardness and spraying condition.

As mentioned the above, a sliding member according to the invention which has a sprayed layer which includes an optimum amount of metal carbide having a high hardness and containing molybdenum for ensuring good bonding between carbide particles will most effectively perform the desired sliding function and will also have excellent wear resistance and abrasion resistance properties. Such a sliding member will operate efficiently even under subjection of the sliding parts of the internal combustion engine subject to severe working conditions.

Advantages and the superiority of this invention have been demonstrated by wear tests in which the amount of wear of sliding members relative to a conventional opposing member was measured.

Samples 1-4 as listed below in Table 1 were prepared. Each sample was fixedly secured to a respective rotary tester so that the samples themselves were stationary pieces. Then these samples were pressingly mounted in contact with corresponding disc-like pieces and the disc-like pieces were rotated to provide relative sliding movement with respect to the stationary samples 1 to 4. During the period of testing, lubricating oil was continuously supplied to the sliding surfaces. The wear amount of these samples was subsequently measured.

TABLE 1

| Sprayed layer | Comparative Samples | | Present Invention | |
|---|---|---|---|---|
| | Sample 1<br>15mm × 20mm × 7mm | Sample 2<br>15mm × 20mm × 7mm | Sample 3<br>15mm × 20mm × 7mm | Sample 4<br>15 mm × 20mm × 7 mm |
| Composition | Chromium carbide<br>85 wt %<br>Molybdenum<br>15 wt % | Molybdenum<br>100 wt % | Chromium carbide<br>98.5 wt %<br>Molybdenum<br>1.5 wt % | Tungsten carbide<br>96 wt %<br>Molybdenum<br>4.0 wt % |
| Porosity | 8% | 15% | 5% | 6% |
| Hardness | Hv 1,200<br>(Carbide hardness) | Hv 800 | Hv 1,200<br>(Carbide hardness) | Hv 1,800<br>(Carbide hardness) |
| Thickness | 0.5 mm | 0.5 mm | 0.5 mm | 0.5 mm |

The opposing members (the disc-like pieces) were made of cast iron consisting of:
C ... 3.2 wt%
Si ... 2.0 wt% p Mn ... 0.8 wt%
Fe ... balance
with a hardness of HRB 98 (Rockwell B scale).

| Testing Conditions | |
|---|---|
| amount of lubricating oil | 0.5l/min |
| lubricating oil | Dafni oil #65 |
| load | 20 kg/cm$^2$ |
| peripheral speed of disc-like member | 5 m/sec |
| running distance | 300 km |

According to the test data the amount of wear of a conventional sprayed layer which included metal carbide and molybdenum (Sample 1) was slightly larger than that of a sprayed layer which consisted of 100% molybdenum (Sample 2).

On the other hand, the amount of wear of a sprayed layer according to the present invention (Samples 3, and 4) was about one-half that of the Samples 1 and 2 therefore effectively proving the superiority of the invention.

While the invention has been described in detail and with reference to specific embodiments thereof, it will be apparent to one skilled in the art that various changes and modifications can be made therein without departing from the spirit and scope thereof.

I claim:

1. A sliding member for use in an internal combustion engine having a sliding surface formed by a sprayed layer consisting of metal carbide and molybdenum, said sprayed layer consisting of 95.5 to 99.5% by weight of metal carbide with the remainder being molybdenum, the hardness of said metal carbide being in a range of Hv 750 to Hv 2,000.

2. The sliding member of claim 1 wherein the porosity of said sprayed layer is 30% or less.

3. The sliding member of claim 1 wherein the thickness of said sprayed layer is 2.5 mm or less.

4. The sliding member of any of claims 1–3 wherein the metal of said metal carbide comprises chromium.

* * * * *